United States Patent
Kavunkal et al.

(10) Patent No.: US 11,895,593 B2
(45) Date of Patent: Feb. 6, 2024

(54) AGGRESSIVE EXTRA MICROSLEEP USING STALE CHANNEL ESTIMATE AND NOISE ESTIMATE TO DECODE CONTROL CHANNEL

(71) Applicant: QUALCOMM Incorporated, San Diego, CA (US)

(72) Inventors: Manu Krishnan Kavunkal, Bangalore (IN); Manav Lnu, Hyderabad (IN); Manish Jain, San Jose, CA (US); Abhishek Kumar, Hyderabad (IN); Venkata Pavan Kumar Bhargav Medepally, Hyderabad (IN); Kiran Singh Matharu, Menlo Park, CA (US); Parees Kambli, San Jose, CA (US); Awlok Singh Josan, San Francisco, CA (US); Farrukh Rashid, San Diego, CA (US); Ashutosh Vinod Agrawal, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 17/654,011

(22) Filed: Mar. 8, 2022

(65) Prior Publication Data
US 2023/0024091 A1   Jan. 26, 2023

(30) Foreign Application Priority Data

Jul. 26, 2021   (IN) .............................. 202141033386

(51) Int. Cl.
*H04W 52/02* (2009.01)
*H04L 1/00* (2006.01)

(52) U.S. Cl.
CPC ......... *H04W 52/0238* (2013.01); *H04L 1/001* (2013.01)

(58) Field of Classification Search
CPC .......................... H04W 52/0238; H04L 1/001
See application file for complete search history.

(56) References Cited

U.S. PATENT DOCUMENTS

2011/0176466 A1* 7/2011 Lindoff ............. H04W 52/0238
                                                        375/316

\* cited by examiner

*Primary Examiner* — Jamal Javaid
(74) *Attorney, Agent, or Firm* — QUALCOMM Incorporated

(57) ABSTRACT

To reduce power consumption, a user equipment (UE) may trigger a microsleep in a subframe when a physical downlink control channel (PDCCH) does not include a downlink grant. However, because the microsleep depends on the PDCCH not including a downlink grant, the UE cannot trigger the microsleep until after the PDCCH is decoded. Accordingly, in some aspects, a UE may enable an aggressive extra microsleep in which a microsleep duration may be increased by reducing a PDCCH decode time. For example, a UE may use a stale channel estimate and noise estimate from a previous subframe to perform PDCCH demapping when conditions related to a PDCCH block error rate are satisfied. In this way, removing channel estimation and noise estimation from a PDCCH demapping path may reduce the PDCCH decode time, whereby the UE may trigger a microsleep sooner to increase a sleep ratio and thereby increase power savings.

30 Claims, 9 Drawing Sheets

AGGRESSIVE EXTRA MICROSLEEP USING STALE CHANNEL ESTIMATE AND NOISE ESTIMATE TO DECODE CONTROL CHANNEL

CROSS-REFERENCE TO RELATED APPLICATION

This Patent Application claims priority to Indian Application No. 202141033386, filed on Jul. 26, 2021, entitled "AGGRESSIVE EXTRA MICROSLEEP USING STALE CHANNEL ESTIMATE AND NOISE ESTIMATE TO DECODE CONTROL CHANNEL," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses associated with an aggressive extra microsleep using a stale channel estimate and noise estimate to decode a control channel.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

Reducing user equipment (UE) power consumption is an area that receives significant attention in context with integrated circuit and device designs and in context with network interactions, as power consumption can impact battery life, user experience, and/or overheating, among other examples. Accordingly, a UE that supports communication using 5G New Radio (NR) may implement one or more power savings techniques to ensure that power efficiency using 5G NR is no worse than power efficiency using 4G Long Term Evolution (LTE), which poses various challenges due to a need to ensure coexistence between 5G NR and 4G LTE on the same silicon die (e.g., resulting in an increased die size that may increase power dissipation). For example, one approach to save UE power may be to increase data transmission efficiency in a loaded case (e.g., by improving average spectral efficiency). Another power savings approach may be to increase a sleep ratio in order to reduce power consumption when the UE does not have data to transmit or receive. For example, a UE may trigger a microsleep in a subframe based on determining that a control channel transmission (e.g., a physical downlink control channel (PDCCH)) received at the start of the subframe does not include a downlink grant (e.g., a physical downlink shared channel (PDSCH) grant). In such cases, the UE may trigger a microsleep in which one or more radio frequency (RF) components and/or other power-consuming components are turned off or operated in a low power state and the UE skips processing remaining non-PDCCH symbols, which results in power savings. Additionally, or alternatively, the UE may trigger a deep microsleep (DMS) in which the sleep duration has a granularity of five (5) to nine (9) symbols after a cell-specific reference signal (CRS) is processed in a fourth symbol of the subframe or an aggressive deep microsleep (ADMS) in which the UE skips processing the CRS symbol 4 to realize a sleep duration of at least ten (10) symbols. However, in each of these cases, decoding the PDCCH may represent a bottleneck to triggering the microsleep, as the UE cannot trigger the microsleep until the UE has decoded the PDCCH and determined that the decoded PDCCH does not include a downlink grant.

Some aspects described herein relate to techniques and apparatuses to reduce a PDCCH decode time, which may enable a UE to trigger a microsleep sooner in a subframe and thereby increase power savings by increasing the time that one or more power consuming components are turned off or in a low power state. For example, in a typical PDCCH decoding, a UE may perform a channel estimation operation, a noise estimation operation, and demapping operation serially, and may then perform a decoding operation based on a result from the demapping operation to determine whether the PDCCH includes a downlink grant. Accordingly, some aspects described herein may remove the channel estimation operation and the noise estimation operation from the demapping path, which enables the UE to trigger the PDCCH demapping immediately at the start of the subframe without having to wait on channel estimation and noise estimation processing on the current subframe. For example, in some aspects, the UE may perform the PDCCH demapping in a current subframe based on a stale channel estimate and a stale noise estimate from a previous subframe, where a "stale" channel and/or noise estimate may generally refer to a channel and/or noise estimate based on measurements obtained in a previous subframe or another relative time prior to the current subframe. In particular, the UE may use the stale channel estimate and the stale noise estimate from the previous subframe to perform PDCCH demapping and decoding in cases where a microsleep feature is enabled at the UE and one or more conditions exist to ensure that a PDCCH block error rate (BLER) limit is satisfied in the current subframe. In this way, removing channel estimation and noise estimation from a PDCCH demapping path may reduce the PDCCH decode time, which may allow the UE to trigger a microsleep sooner in a subframe and thereby increase power savings by increasing the time that one or more RF components and/or other power-consuming components are turned off or operated in a low power state.

Some aspects described herein relate to a method of wireless communication performed by a UE. The method may include receiving a control channel transmission in a current subframe. The method may include decoding the control channel transmission in the current subframe using a stale channel estimate and a stale noise estimate from a previous subframe based at least in part on one or more parameters satisfying a control channel BLER limit in the current subframe. The method may include triggering a microsleep in the current subframe after the control channel transmission is decoded based at least in part on the decoded control channel transmission not including a downlink grant.

Some aspects described herein relate to a UE for wireless communication. The UE may include a memory and one or more processors coupled to the memory. The one or more processors may be configured to receive a control channel transmission in a current subframe. The one or more processors may be configured to decode the control channel transmission in the current subframe using a stale channel estimate and a stale noise estimate from a previous subframe based at least in part on one or more parameters satisfying a control channel BLER limit in the current subframe. The one or more processors may be configured to trigger a microsleep in the current subframe after the control channel transmission is decoded based at least in part on the decoded control channel transmission not including a downlink grant.

Some aspects described herein relate to a non-transitory computer-readable medium that stores a set of instructions for wireless communication by a UE. The set of instructions, when executed by one or more processors of the UE, may cause the UE to receive a control channel transmission in a current subframe. The set of instructions, when executed by one or more processors of the UE, may cause the UE to decode the control channel transmission in the current subframe using a stale channel estimate and a stale noise estimate from a previous subframe based at least in part on one or more parameters satisfying a control channel BLER limit in the current subframe. The set of instructions, when executed by one or more processors of the UE, may cause the UE to trigger a microsleep in the current subframe after the control channel transmission is decoded based at least in part on the decoded control channel transmission not including a downlink grant.

Some aspects described herein relate to an apparatus for wireless communication. The apparatus may include means for receiving a control channel transmission in a current subframe. The apparatus may include means for decoding the control channel transmission in the current subframe using a stale channel estimate and a stale noise estimate from a previous subframe based at least in part on one or more parameters satisfying a control channel BLER limit in the current subframe. The apparatus may include means for triggering a microsleep in the current subframe after the control channel transmission is decoded based at least in part on the decoded control channel transmission not including a downlink grant.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
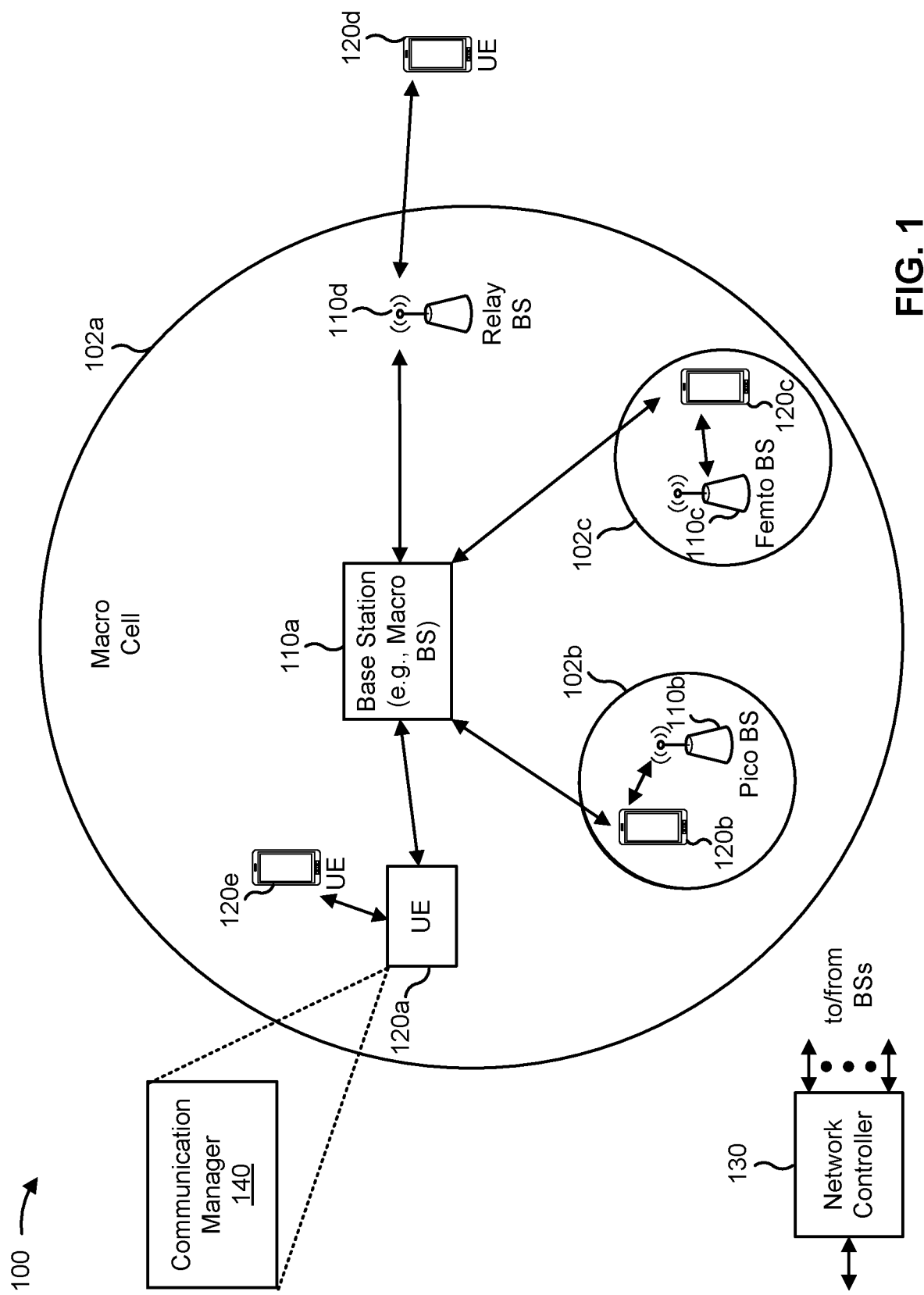
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 4G or Long Term Evolution (LTE) or a 5G or New Radio (NR) radio access technology (RAT), aspects of the present disclosure can be applied to other RATs, such as a 3G RAT and/or a RAT subsequent to 5G (e.g., 6G).

FIG. 1 is a diagram illustrating a wireless network 100 in which aspects of the present disclosure may be practiced. The wireless network 100 may be or may include elements of a 5G (e.g., NR) network and/or a 4G (e.g., LTE) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a control channel transmission in a current subframe; decode the control channel transmission in the current subframe using a stale channel estimate and a stale noise estimate from a previous subframe based at least in part on one or more parameters satisfying a control channel block error rate (BLER) limit in the current subframe; and trigger a microsleep in the current subframe after the control channel transmission is decoded based at least in part on the decoded control channel transmission not including a downlink grant. Additionally, or alternatively, the communication manager 140 may perform one or more other operations described herein.

As indicated above, FIG. 1 is provided as an example. Other examples may differ from what is described with regard to FIG. 1.

Figure 2:
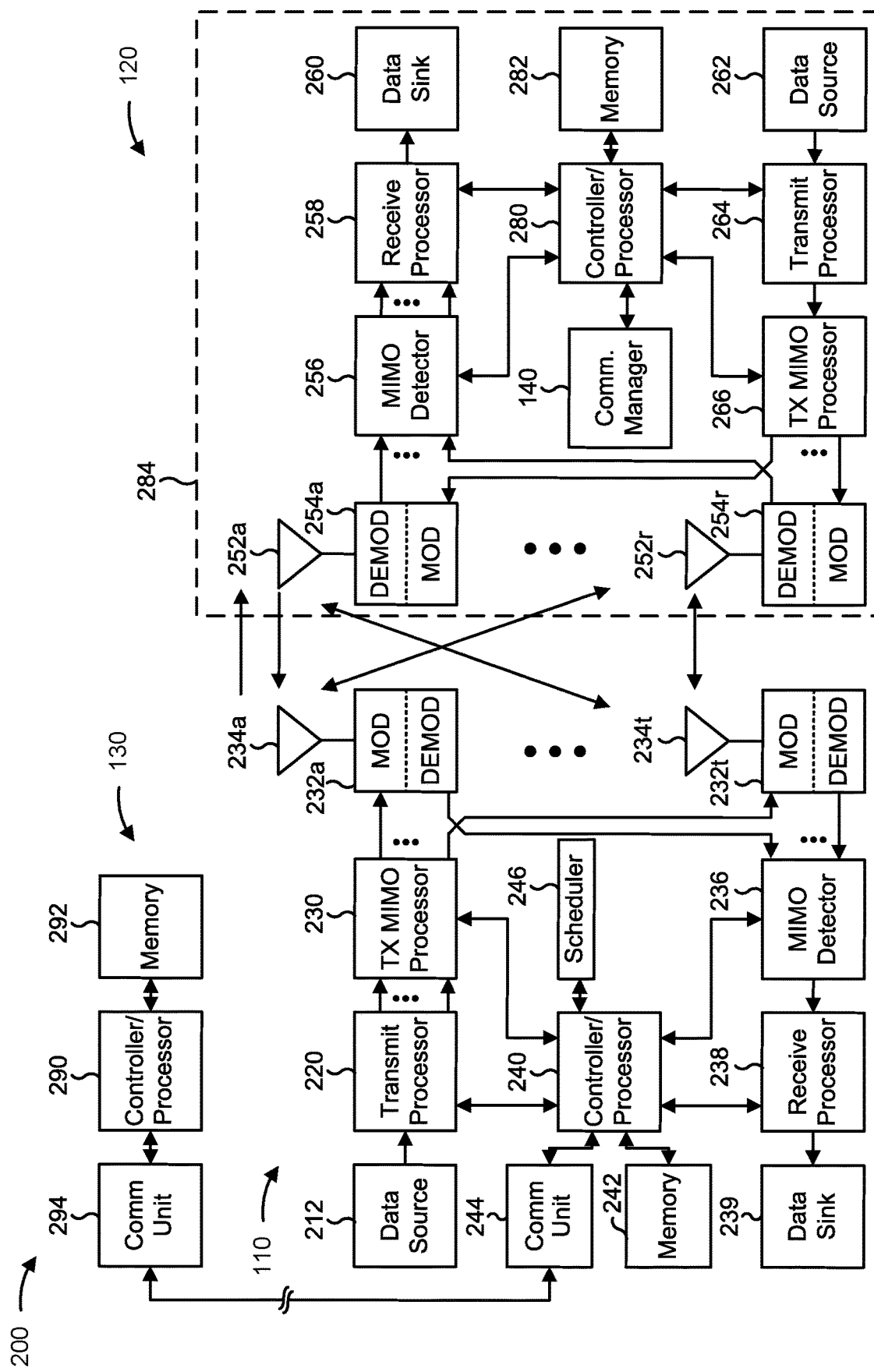
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (Tx) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with an aggressive extra microsleep (AEMS) using a stale channel estimate and noise estimate to decode a control channel, as described in more detail elsewhere herein. For example, the controller/processor 240 of the base station 110, the controller/processor 280 of the UE 120, and/or any other component(s) of FIG. 2 may perform or direct operations of, for example, method 600 of FIG. 6 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 600 of FIG. 6 and/or other processes as described herein. In some examples, executing instructions may include running the instructions, converting the instructions, compiling the instructions, and/or interpreting the instructions, among other examples.

In some aspects, the UE 120 includes means for receiving a control channel transmission in a current subframe; means for decoding the control channel transmission in the current subframe using a stale channel estimate and a stale noise estimate from a previous subframe based at least in part on one or more parameters satisfying a control channel BLER limit in the current subframe; and/or means for triggering a microsleep in the current subframe after the control channel transmission is decoded based at least in part on the decoded control channel transmission not including a downlink grant. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
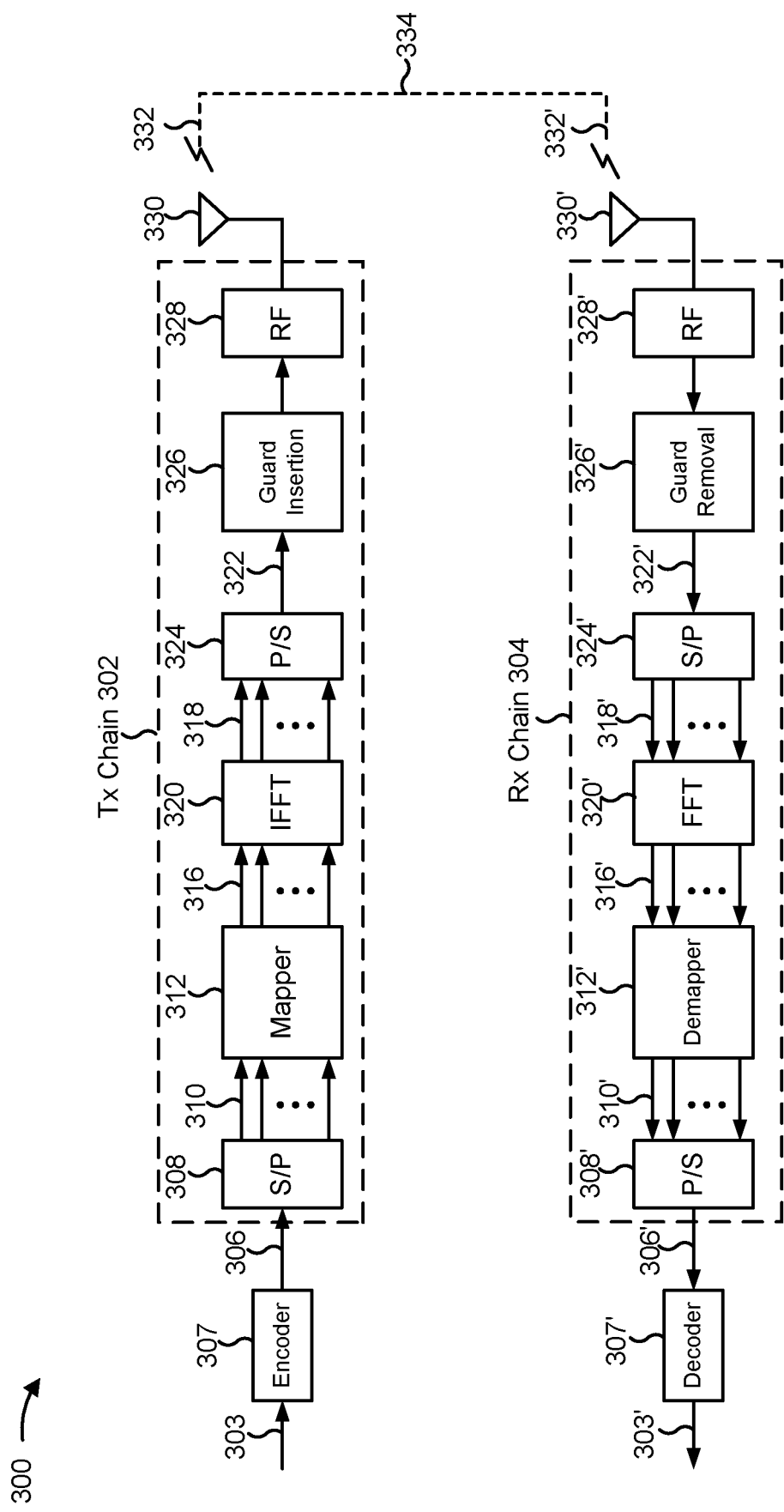
FIG. 3 is a diagram illustrating an example of a transmit chain and a receive chain that may be implemented at a UE.

FIG. 3 is a diagram illustrating an example 300 of a Tx chain 302 and a receive (Rx) chain 304 of a UE 120, in accordance with the present disclosure. In some aspects, one or more components of Tx chain 302 may be implemented in transmit processor 264, TX MIMO processor 266, modem 254, and/or controller/processor 280, as described above in connection with FIG. 2. In some aspects, Tx chain 302 may be implemented in UE 120 for transmitting data 306 (e.g., uplink data, an uplink reference signal, and/or uplink control information) to base station 110 on an uplink channel.

An encoder 307 may alter a signal (e.g., a bitstream) 303 into data 306. Data 306 to be transmitted is provided from encoder 307 as input to a serial-to-parallel (S/P) converter 308. In some aspects, S/P converter 308 may split the transmission data into N parallel data streams 310.

The N parallel data streams 310 may then be provided as input to a mapper 312. Mapper 312 may map the N parallel data streams 310 onto N constellation points. The mapping may be done using a modulation constellation, such as binary phase-shift keying (BPSK), quadrature phase-shift keying (QPSK), 8 phase-shift keying (8 PSK), quadrature amplitude modulation (QAM), etc. Thus, mapper 312 may output N parallel symbol streams 316, each symbol stream 316 corresponding to one of N orthogonal subcarriers of an inverse fast Fourier transform (IFFT) component 320. The N parallel symbol streams 316 are represented in the frequency domain and may be converted into N parallel time domain sample streams 318 by IFFT component 320.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of guard insertion component 326 may then be upconverted to a desired transmit frequency band by a radio frequency (RF) front end 328. An antenna 330 may then transmit the resulting signal 332.

In some aspects, Rx chain 304 may utilize OFDM/OFDMA. In some aspects, one or more components of Rx chain 304 may be implemented in receive processor 258, MIMO detector 256, modem 254, and/or controller/processor 280, as described above in connection with FIG. 2. In some aspects, Rx chain 304 may be implemented in UE 120 for receiving data 306 (e.g., downlink data, a downlink reference signal, and/or downlink control information) from base station 110 on a downlink channel.

A transmitted signal 332 is shown traveling over a wireless channel 334 from Tx chain 302 to Rx chain 304. When a signal 332' is received by an antenna 330', the received signal 332' may be downconverted to a baseband signal by an RF front end 328'. A guard removal component 326' may then remove the guard interval that was inserted between OFDM/OFDMA symbols by guard insertion component 326.

The output of guard removal component 326' may be provided to an S/P converter 324'. The output may include an OFDM/OFDMA symbol stream 322', and S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by mapper 312, thereby outputting N parallel data streams 310'. A P/S converter 308' may combine the N parallel data streams 310' into a single data stream 306'. Ideally, data stream 306' corresponds to data 306 that was provided as input to Tx chain 302. Data stream 306' may be decoded into a decoded data stream 303' by decoder 307'.

Reducing UE power consumption is an area that receives significant attention in context with integrated circuit and device designs and in context with network interactions, as power consumption can impact battery life, user experience, and/or overheating, among other examples. Accordingly, a UE that supports communication using 5G NR may implement one or more power savings techniques to ensure that power efficiency using 5G NR is no worse than power efficiency using 4G LTE, which poses various challenges due to a need to ensure coexistence between 5G NR and 4G LTE on the same silicon die (e.g., resulting in an increased die size that may increase power dissipation). For example, one approach to save UE power may be to increase data transmission efficiency in a loaded case (e.g., by improving average spectral efficiency). Another power savings approach may be to increase a sleep ratio in order to reduce power consumption when the UE does not have data to transmit or receive. For example, as described in further detail below in connection with FIG. 4, a UE may trigger a microsleep (or μSleep) in a subframe based on determining that a control channel transmission (e.g., a physical downlink control channel (PDCCH)) received at the start of the subframe does not include a downlink grant (e.g., a physical downlink shared channel (PDSCH) grant). In such cases, the UE may trigger a microsleep in which one or more RF components and/or other power-consuming components are turned off or operated in a low power state and the UE skips processing remaining non-PDCCH symbols, which results in power savings. Additionally, or alternatively, the UE may trigger a DMS in which the sleep duration has a granularity of five (5) to nine (9) symbols after a CRS is processed in a fourth symbol of the subframe or an aggressive deep microsleep (ADMS) in which the UE further skips processing the CRS symbol 4 to realize a sleep duration of at least (10) symbols. However, in each of these cases, decoding the PDCCH may represent a bottleneck to triggering the microsleep, as the UE cannot trigger the microsleep until the UE has decoded the PDCCH and determined that the decoded PDCCH does not include a downlink grant.

Some aspects described herein relate to techniques and apparatuses to reduce a PDCCH decode time, which may enable a UE to trigger a microsleep sooner in a subframe and thereby increase power savings by increasing the time that one or more power consuming components are turned off or in a low power state. For example, in a typical PDCCH decoding, a UE may perform a channel estimation operation, a noise estimation operation, and demapping operation serially, and may then perform a decoding operation based on a result from the demapping operation to determine whether the PDCCH includes a downlink grant. Accordingly, some aspects described herein may remove the channel estimation operation and the noise estimation operation from the demapping path, which enables the UE to trigger the PDCCH demapping immediately at the start of the subframe without having to wait on channel estimation and noise estimation processing on the current subframe. For example, in some aspects, the UE may perform the PDCCH demapping in a current subframe based on a stale channel estimate and a stale noise estimate from a previous subframe, where a "stale" channel and/or noise estimate may generally refer to a channel and/or noise estimate based on measurements obtained in a previous subframe or another relative time prior to the current subframe. In particular, the UE may use the stale channel estimate and the stale noise estimate from the previous subframe to perform PDCCH demapping and decoding in cases where a microsleep feature is enabled at the UE and one or more conditions exist to ensure that a PDCCH BLER limit is satisfied in the current subframe. In this way, removing channel estimation and noise estimation from a PDCCH demapping path may reduce the PDCCH decode time, which may allow the UE to trigger a microsleep sooner in a subframe and thereby increase power savings by increasing the time that one or more RF components and/or other power-consuming components are turned off or operated in a low power state.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
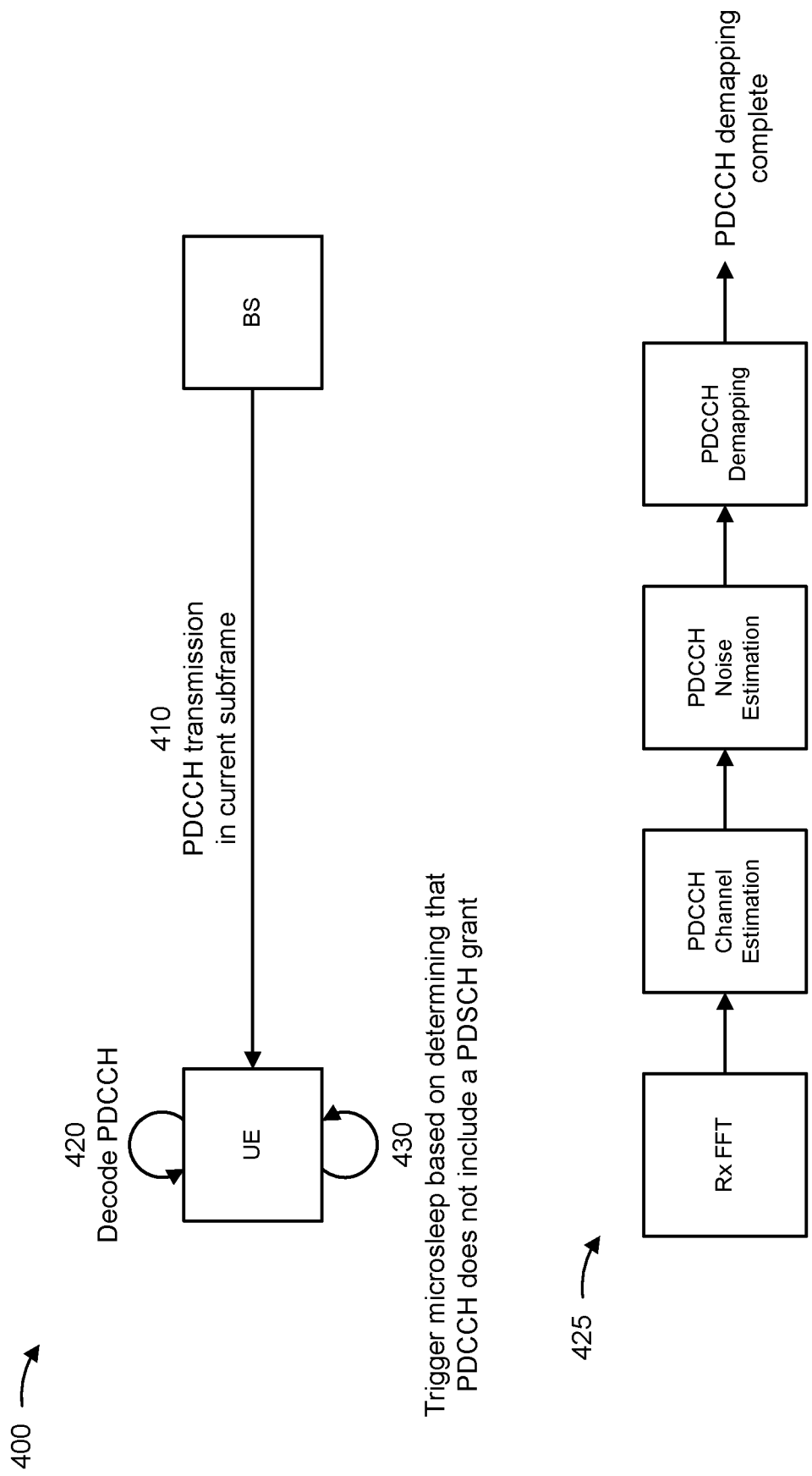
FIG. 4 is a diagram illustrating an example associated with triggering a microsleep at a UE to conserve power.

FIG. 4 is a diagram illustrating an example 400 associated with triggering a microsleep at a UE to conserve power. As shown in FIG. 4, example 400 includes communication between a base station (e.g., base station 110) and a UE (e.g., UE 120). In some aspects, the base station and the UE may communicate in a wireless network, such as wireless network 100. The base station and the UE may communicate via a wireless access link, which may include an uplink and a downlink.

As shown in FIG. 4, at 410, the UE may receive a PDCCH transmission from a base station in a current subframe. In general, the PDCCH transmission may be received in a PDCCH occasion that includes one or more symbols at the start of the subframe.

As further shown in FIG. 4, at 420, the UE may decode the PDCCH transmission. For example, as shown at 425, the UE may decode the PDCCH transmission using an FFT component configured to convert N parallel time-domain symbol streams into a frequency domain and to output N parallel frequency-domain symbol streams. As further shown, the UE may then perform channel estimation and noise estimation for the PDCCH (e.g., typically based on a CRS transmitted on symbol zero (0) of the current subframe), and the UE may then perform a PDCCH demapping based on the channel estimate and the noise estimate for the current subframe. Accordingly, after the PDCCH demapping is complete, N parallel data streams may be combined into a single data stream that may be decoded by a decoder component. The UE may then determine whether the decoded PDCCH includes a downlink grant to schedule a PDSCH. In cases where the UE determines that the PDCCH includes a downlink grant to schedule a PDSCH, the UE may process the PDSCH at a starting time indicated in the PDCCH (e.g., in a time domain resource assignment table). Alternatively, as shown at 430, the UE may trigger a microsleep in which one or more RF components and/or other power-consuming components are turned off or operated in a low power state and the UE skips processing remaining non-PDCCH symbols in the current subframe to conserve power.

In general, as described herein, the UE may trigger the microsleep in cases where the PDCCH does not include a downlink grant, which may be known to the UE at the time that the PDCCH decoding has finished processing. Accordingly, triggering the microsleep is generally dependent on the UE completing channel estimation and noise estimation for the current subframe, as PDCCH demapping and decoding cannot be initiated until the channel estimate and the noise estimate for the current subframe is available. Furthermore, although existing techniques may be used to extend the microsleep duration (e.g., a DMS in which the UE still processes CRS symbol 4 such that a microsleep duration may last from 5 symbols up to a maximum of 9 symbols and/or an ADMS in which the UE skips processing CRS symbol 4 such that the microsleep duration may last at least 10 symbols), the existing techniques similarly depend on completing channel estimation and noise estimation at the start of the subframe before triggering the PDCCH demapping. In other words, because existing microsleep techniques (e.g., µSleep, DMS, and/or ADMS) all perform channel estimation, noise estimation, PDCCH demapping, and PDCCH decoding serially, the channel estimation and noise estimation tasks represent a bottleneck in the PDCCH decoding process. The channel estimation and noise estimation tasks therefore limit how soon the microsleep can be triggered, which in turn limits the maximum timeline savings and the maximum power savings that can be achieved in a subframe.

Accordingly, as described in further detail herein (e.g., in connection with FIGS. 5A-5B), the channel estimation and the noise estimation tasks may be removed from the PDCCH demapping path, which enables the UE to trigger the PDCCH demapping immediately after reception of the last PDCCH symbol without having to wait until channel estimation and noise estimation processing completes in the current subframe. For example, the PDCCH demapping in a current subframe may be performed based on a stale channel estimate and a stale noise estimate from a previous subframe, with channel estimation and noise estimate for the current subframe performed in parallel with the PDCCH demapping and subsequent decoding. In this way, by removing channel estimation and noise estimation from the PDCCH demapping path, the PDCCH decode time may be reduced, which may allow the UE to trigger a microsleep sooner in a subframe and thereby increase power savings in cases where the PDCCH does not include a downlink grant.

As indicated above, FIG. 4 is provided as an example. Other examples may differ from what is described with regard to FIG. 4.

Figure 5A:
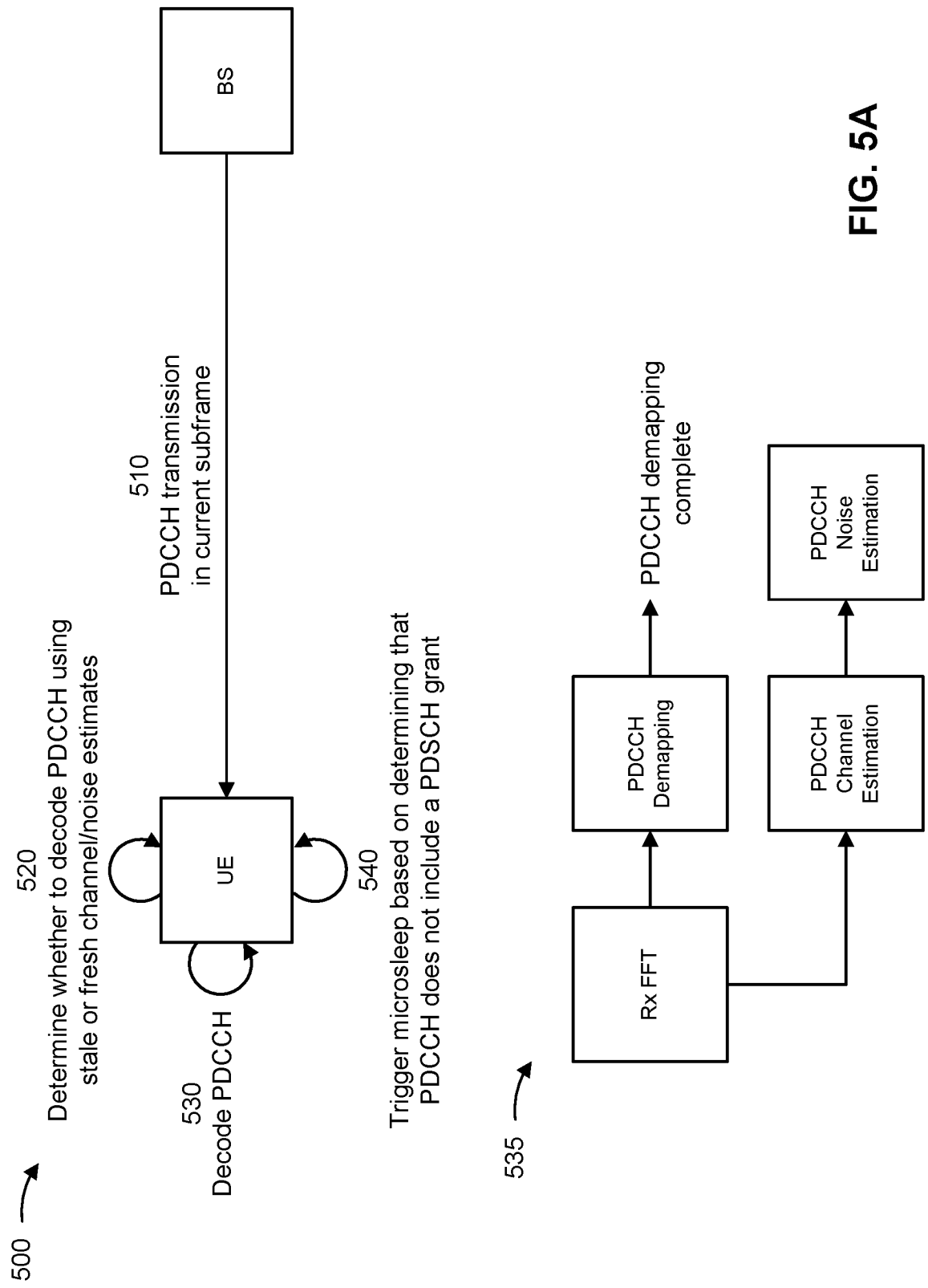
FIGS. 5A-5B are diagrams illustrating an example associated with an aggressive extra microsleep using a stale channel estimate and noise estimate to decode a control channel.
Figure 5B:
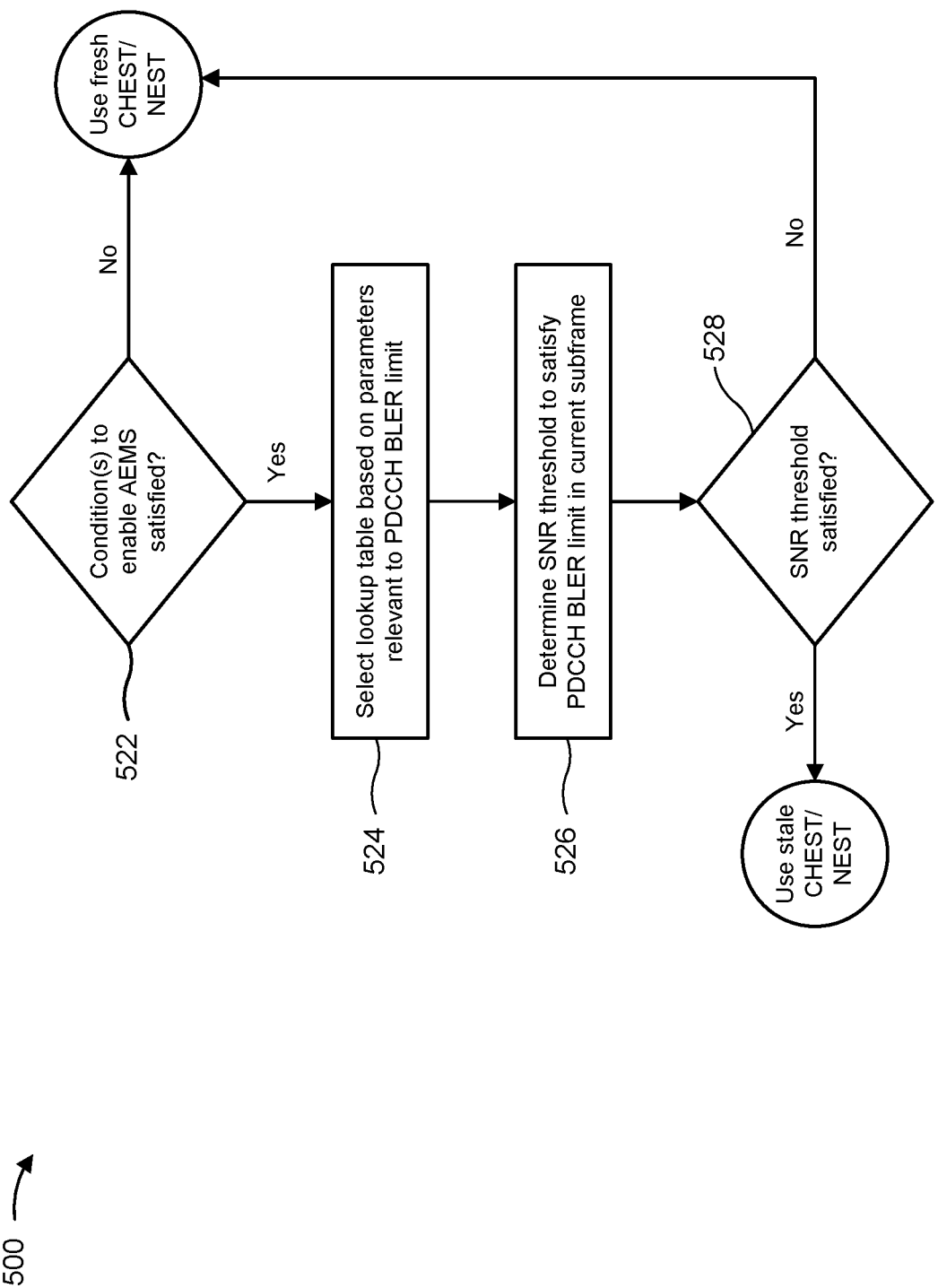

FIGS. 5A-5B are diagrams illustrating an example 500 associated with an AEMS using a stale channel estimate and noise estimate to decode a control channel. As shown in FIGS. 5A-5B, example 500 includes communication between a base station (e.g., base station 110) and a UE (e.g., UE 120). In some aspects, the base station and the UE may communicate in a wireless network, such as wireless network 100. The base station and the UE may communicate via a wireless access link, which may include an uplink and a downlink.

As shown in FIG. 5A, at 510, the UE may receive a PDCCH transmission from a base station in a current subframe. In general, the PDCCH transmission may be received in a PDCCH occasion that includes one or more symbols at the start of the subframe.

As further shown in FIG. 5A, at 520, the UE may determine whether to decode the PDCCH transmission in the current subframe using a stale channel estimate and a stale noise estimate from a previous subframe or using a fresh channel estimate and a fresh noise estimate from the current subframe. In general, the stale channel estimate and the stale noise estimate may be based on one or more measurements taken in a previous subframe and may be used when channel conditions permit the UE to decode the PDCCH with a BLER that satisfies a BLER limit associated with the PDCCH (e.g., one percent). For example, in cases where channel conditions change from the previous subframe to the current subframe, using the stale channel estimate and the stale noise estimate from the previous subframe to decode the PDCCH in the current subframe may increase the BLER associated with decoding the PDCCH. In some aspects, the UE may therefore determine whether one or more conditions associated with using stale channel estimate and a stale noise estimate from a previous subframe are satisfied, and the UE may determine whether to decode the PDCCH transmission in the current subframe using a stale channel estimate and a stale noise estimate from a previous subframe or a fresh channel estimate and a fresh noise estimate from the current subframe.

For example, FIG. 5B illustrates an example of decision logic that may be implemented by a controller of the UE to determine whether to decode the PDCCH in the current subframe using the stale channel estimate and the stale noise estimate from the previous subframe or a fresh channel estimate and a fresh noise estimate from the current subframe. As shown in FIG. 5B, at 522, the controller of the UE may initially determine whether one or more conditions to enable an AEMS feature (e.g., permitting use of the stale channel estimate and the stale noise estimate from the previous subframe) are satisfied. For example, the UE may determine a number of active component carriers that are configured for the UE, where the AEMS feature may be enabled based on the number of active component carriers satisfying a threshold or disabled based on the number of active component carriers failing to satisfy the threshold (e.g., the threshold may have a value of N, such as one (1) or another suitable value, whereby the AEMS feature may be enabled if N or fewer active component carriers are configured or disabled if more than N active component carriers are configured). Additionally, or alternatively, the AEMS feature may be disabled based on an internal configuration or an internal signal that disables microsleep at a hardware level. Additionally, or alternatively, the AEMS feature may be disabled based on unavailability of a stale channel estimate and/or a stale noise estimate from a previous subframe. For example, in some aspects, the AEMS feature may be enabled in a subframe n only in cases where a stale channel estimate and a stale noise estimate are available from subframe n−1 (e.g., a subframe that immediately precedes the current subframe). Alternatively, the AEMS feature may be enabled in a current subframe only in cases where a stale channel estimate and a stale noise estimate are available within a threshold time of the current subframe (e.g., within a threshold number of previous subframes), where the threshold time may be configured based on one or more parameters such as a Doppler measurement, a channel correlation, a residual frequency error, and/or a number of receive antennas, among other examples. In such cases, a stale channel estimate and a stale noise estimate that is valid for the current subframe may be unavailable if the previous subframe(s) were uplink subframes and/or if one or more buffers or other memory resources have changed such that there is no stale channel estimate and stale noise estimate available in the one or more buffers.

In some aspects, the one or more conditions to enable the AEMS feature may be based on one or more parameters that may impact a channel estimation error associated with using a stale channel estimate and a stale noise estimate from a previous subframe. For example, in cases where the UE and/or the base station is moving at a fast rate, channel conditions may change from one subframe to another such that using a stale channel estimate and a stale noise estimate from a previous subframe may result in a channel estimation error that is insufficient to satisfy the BLER requirement in the current subframe. In contrast, when the UE and the base station are stationary and/or moving at a slow speed (e.g., walking versus traveling in a car or train), there may be little or no change in channel conditions from one subframe to another such that a stale channel estimate and a stale noise estimate from a previous subframe can be used to demap and decode the PDCCH in the current subframe with a BLER that satisfies the BLER requirement in the current subframe. Accordingly, in some aspects, the one or more conditions to enable the AEMS feature in the current subframe may be based on a Doppler measurement, which may have a relatively high value when the UE and/or base station are moving at a fast speed or a relatively low value when the UE and base station are stationary or moving at slow speeds. For example, in some aspects, the AEMS feature may be enabled in cases where the Doppler measurement satisfies (e.g., is less than or equal to) a threshold (e.g., twenty (20) Hertz (Hz)) or disabled in cases where the Doppler measurement fails to satisfy (e.g., exceeds) the threshold. Additionally, or alternatively, the parameter(s) that may impact the channel estimation error may include a residual frequency error, which may occur when a local oscillator used for downconversion at the UE does not synchronize with a carrier signal in a signal received at the UE (e.g., due to a frequency mismatch between local oscillators at the base station and the UE and/or a Doppler effect caused by movement of the base station and/or the UE). Accordingly, because a large residual frequency error can cause channel estimation errors, the AEMS feature may be enabled in cases where the residual frequency error satisfies (e.g., is less than or equal to) a threshold (e.g., thirty (30) Hertz) or disabled in cases where the residual frequency error fails to satisfy (e.g., exceeds) the threshold.

In some aspects, as shown in FIG. 5B, the UE may determine that a fresh channel estimate and a fresh noise estimate is to be used to decode the PDCCH in the current subframe in cases where one or more conditions to enable the AEMS feature are not satisfied in the current subframe (e.g., a Doppler measurement fails to satisfy a threshold, a residual frequency error fails to satisfy a threshold, a number of active component carriers fails to satisfy a threshold, microsleep is disabled by an internal signal or an internal configuration, a stale channel estimate and/or a stale noise estimate from a previous subframe is unavailable for one or more receive antennas, and/or a stale channel estimate and/or a stale noise estimate from a previous subframe is unavailable in one or more buffers). Alternatively, as shown in FIG. 5B at 524, the UE may select a lookup table based on one or more parameters that are relevant to (e.g., have an impact on) the BLER limit for decoding the PDCCH in the current subframe.

For example, in some aspects, the UE may store one or more lookup tables that indicate a signal-to-noise ratio (SNR) threshold that may satisfy the BLER limit for decoding the PDCCH in the current subframe based on one or more combinations of parameters (e.g., Doppler measurement, whether the wireless channel between the base station and the UE is associated with a high channel correlation or a low channel correlation, a number of receive antennas equipped at the UE, a communication bandwidth, a code rate, and/or a residual frequency error). For example, the UE may be configured to store one or more lookup tables for different combinations of parameters, such as a first lookup table for one receive antenna and a low channel correlation, a second lookup table for one receive antenna and a high channel correlation, a third lookup table two receive antennas and a low channel correlation, and a fourth lookup table two receive antennas and a high channel correlation, where each lookup table indicates a SNR threshold that is likely to satisfy the BLER limit for a given PDCCH code rate. In some aspects, one or more parameters may adopt the same lookup table for different values (e.g., the same lookup table may be used for two receive antennas and four receive antennas, as an SNR that satisfies a BLER limit when the UE has two receive antennas may also satisfy the BLER limit when the UE has four receive antennas). Accordingly, the UE may select, among one or more lookup tables that are associated with different parameter tuples (e.g., number of receive antennas and channel correlation), a lookup table corresponding to values of the appropriate parameter values in the current subframe.

In some aspects, as further shown in FIG. 5B, at 526, the UE may determine an SNR threshold that satisfies the BLER limit associated with PDCCH decoding in the current subframe. For example, in some aspects, each lookup table stored at the UE may include SNR values that satisfy the BLER limit for a set of relevant code rate values given a particular parameter tuple. For example, as described above, the UE may select the appropriate lookup table based on the values of the parameter tuple for the current subframe, and the UE may identify an entry in the selected lookup table that corresponds to a code rate for the PDCCH in the current subframe, which may be predicted based on PDCCH code rates in one or more previous subframes (e.g., because the UE may not know the actual code rate for the PDCCH in the current subframe prior to decoding the PDCCH). The identified entry in the lookup table may indicate, based on the predicted code rate for the PDCCH in the current subframe, an SNR threshold that provides reliable PDCCH decoding results (e.g., satisfying the BLER limit) when a stale channel estimate and a stale noise estimate are used to demap and decode a PDCCH. For example, the SNR thresholds indicated in each lookup table may be defined based on channel conditions where the Doppler measurement and/or residual frequency error have values that satisfy the appropriate threshold(s) for enabling the AEMS feature (e.g., a Doppler measurement of 20 Hz or less and a residual frequency error of 40 Hz or less), and individual entries in the lookup tables may indicate SNR thresholds that satisfy the BLER limit based on the PDCCH code rate, the channel correlation, and/or the number of receive antennas, among other examples. Furthermore, in some aspects, the SNR thresholds indicated in each lookup table may be defined based on a default communication bandwidth (e.g., 10 MHz), which may result in conservative SNR thresholds that have a higher probability of satisfying the BLER limit at higher communication bandwidths (e.g., 20 MHz) or aggressive SNR thresholds that have a lower probability of satisfying the BLER limit at lower communication bandwidths (e.g., 5 MHz). Alternatively, in some aspects, the communication bandwidth and/or other suitable parameters (e.g., different Doppler bins and/or residual frequency errors) may be used as additional parameters in the parameter tuples associated with the lookup table(s) stored at the UE (e.g., resulting in more lookup tables that indicate SNR thresholds for different combinations of parameters at a finer granularity).

In some aspects, as further shown in FIG. 5B, at 528, the UE may determine whether the SNR threshold is satisfied for the current subframe. For example, the UE may obtain an SNR measurement (e.g., within a sliding time window) and may determine that the SNR threshold is satisfied based on the SNR measurement equaling or exceeding the SNR threshold or that the SNR threshold is not satisfied based on the SNR measurement failing to equal or exceed the SNR threshold. Accordingly, as shown in FIG. 5B, the UE may determine that a fresh channel estimate and a fresh noise estimate is to be obtained for the current subframe and used to decode the PDCCH in the current subframe in cases where the SNR threshold is not satisfied. For example, when the SNR measurement fails to satisfy the SNR threshold, using the stale channel estimate and the stale noise estimate to demap and decode the PDCCH in the current subframe may result in a BLER that fails to satisfy the BLER limit (e.g., 1%), whereby the UE may determine that the fresh channel estimate and the fresh noise estimate is to be obtained and used to decode the PDCCH in the current subframe. Alternatively, as shown in FIG. 5B, the UE may determine that the stale channel estimate and the stale noise estimate from the previous subframe can be used to demap and decode the PDCCH in the current subframe in cases where the SNR threshold is satisfied. For example, when the SNR measurement satisfies the SNR threshold, using the stale channel estimate and the stale noise estimate to demap and decode the PDCCH in the current subframe may result in a BLER that satisfies the BLER limit, whereby the UE may determine that the stale channel estimate and the stale noise estimate can be used to demap and decode the PDCCH in the current subframe. In this way, as described herein, the UE may trigger a microsleep earlier in the subframe, which may result in power savings.

In some aspects, as shown in FIG. 5A, at 530, the UE may decode the PDCCH using either a stale channel and noise estimate from a previous subframe or a fresh channel and noise estimate from the current subframe based on the decision logic described in further detail above in connection with FIG. 5B. In some aspects, in cases where the UE determines that the PDCCH is to be demapped and decoded using a fresh channel estimate and a fresh noise estimate, the UE may serially perform an FFT operation, a channel estimation operation, a noise estimation operation, a PDCCH demapping operation, and a PDCCH decoding operation, as described above in connection with FIG. 4. Alternatively, in cases where the UE determines that the PDCCH is to be demapped and decoded using a stale channel estimate and a stale noise estimate to enable the AEMS feature, the UE may remove the channel estimation and noise estimation operations from the PDCCH demapping path. For example, as shown at 535, the UE may use the stale channel estimate and the stale noise estimate from the previous subframe to perform the PDCCH demapping operation immediately after an FFT operation is performed on the received PDCCH symbols. As further shown, the UE may perform channel estimation and noise estimation in parallel with the PDCCH demapping and decoding operation (e.g., in a separate hardware vector).

Accordingly, as shown at 540, the UE may trigger a microsleep after the PDCCH has been demapped and decoded based on determining that the PDCCH does not include a downlink grant. In this way, PDCCH demapping can be initiated earlier in the subframe because the PDCCH demapping operation is not dependent on upfront channel estimation and noise estimation processing completing first. Furthermore, the UE can obtain the fresh channel estimate and the fresh noise estimate for the current subframe in parallel with the PDCCH demapping operation and/or in the background after the microsleep has been triggered and RF components and/or other power-consuming components have been turned off or switched to a low power state. For example, in some aspects, the channel estimate and the noise estimate for the current subframe may be obtained and made available for consumption in a next subframe depending on channel conditions and/or other parameters in the next subframe (e.g., following the same decision logic shown in FIG. 5B in the next subframe). In this way, by using a stale channel estimate and a stale noise estimate from a previous subframe to perform PDCCH demapping and decoding when channel conditions and/or other parameters permit, the UE can trigger the microsleep earlier in the subframe by removing channel estimation and noise estimation from the PDCCH demapping path (e.g., relative to μSleep, DMS, or ADMS techniques that require channel estimation and noise estimation for the current subframe to be completed before triggering PDCCH demapping). Furthermore, by triggering the microsleep earlier in the subframe, power-consuming RF components may spend more time in an off or low power state, which results in power savings (e.g., relative to μSleep, DMS, or ADMS techniques).

As indicated above, FIGS. 5A-5B are provided as an example. Other examples may differ from what is described with regard to FIGS. 5A-5B.

Figure 6:
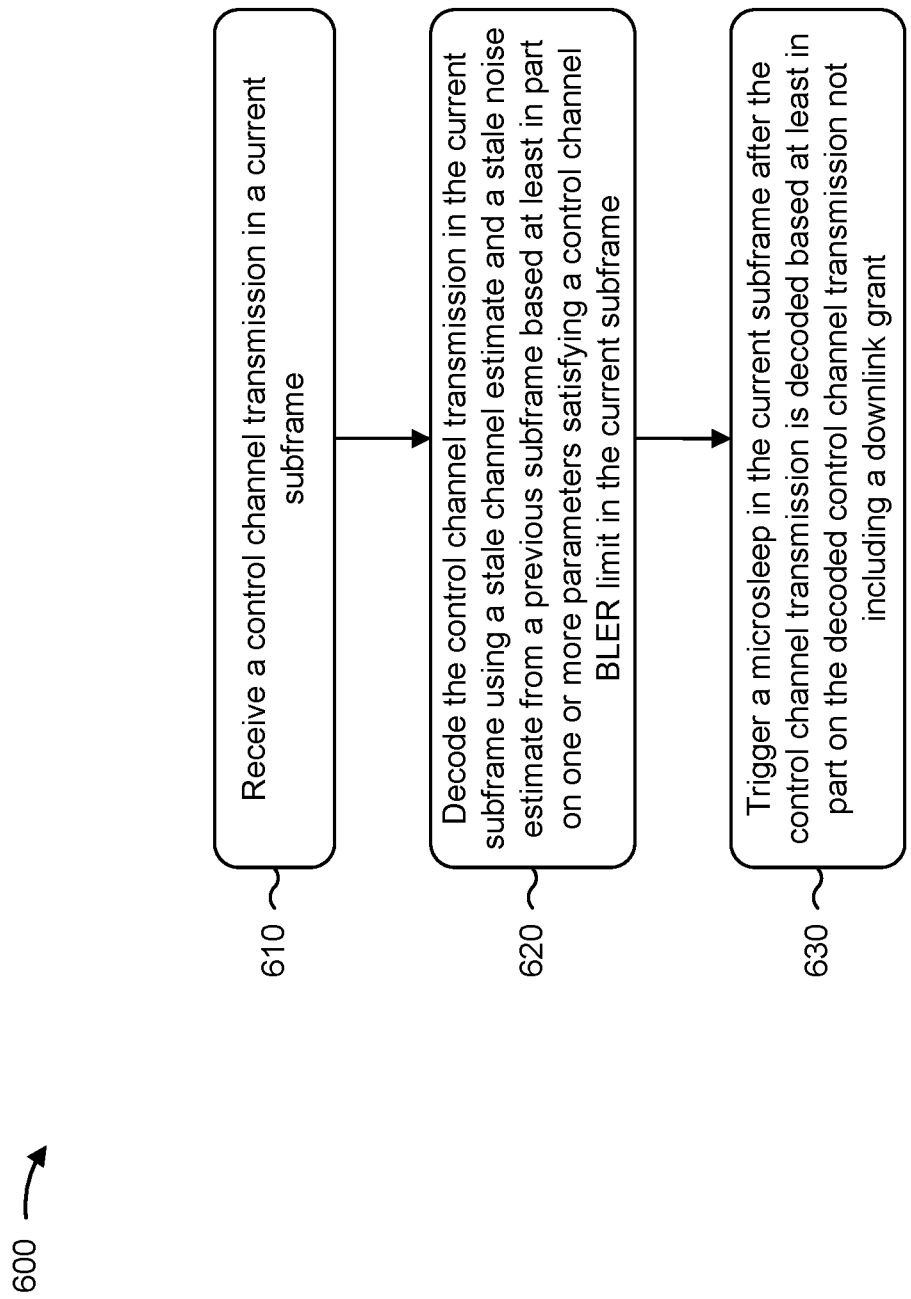
FIG. 6 is a flowchart of an example method of wireless communication.

FIG. 6 is a flowchart of an example method 600 of wireless communication. The method 600 may be performed by, for example, a UE (e.g., UE 120).

At 610, the UE may receive a control channel transmission in a current subframe. For example, the UE (e.g., using communication manager 140 and/or reception component 702, depicted in FIG. 7) may receive a control channel transmission in a current subframe, as described above in connection with, for example, FIG. 5A at 510.

At 620, the UE may decode the control channel transmission in the current subframe using a stale channel estimate and a stale noise estimate from a previous subframe based at least in part on one or more parameters satisfying a control channel BLER limit in the current subframe. For example, the UE (e.g., using communication manager 140 and/or decoder component 708, depicted in FIG. 7) may decode the control channel transmission in the current subframe using a stale channel estimate and a stale noise estimate from a previous subframe based at least in part on one or more parameters satisfying a control channel BLER limit in the current subframe, as described above in connection with, for example, FIG. 5A at 520, 530, and 535 and FIG. 5B at 522-528.

At 630, the UE may trigger a microsleep in the current subframe after the control channel transmission is decoded based at least in part on the decoded control channel transmission not including a downlink grant. For example, the UE (e.g., using communication manager 140 and/or microsleep component 710, depicted in FIG. 7) may trigger a microsleep in the current subframe after the control channel transmission is decoded based at least in part on the decoded control channel transmission not including a downlink grant, as described above in connection with, for example, FIG. 5A at 540.

In some aspects, the one or more parameters satisfy the control channel BLER limit based at least in part on a Doppler estimate satisfying a threshold. In some aspects, the one or more parameters satisfy the control channel BLER limit based at least in part on a number of active component carriers satisfying a threshold. In some aspects, the one or more parameters satisfy the control channel BLER limit based at least in part on a residual frequency error satisfying a threshold. In some aspects, the one or more parameters satisfy the control channel BLER limit based at least in part on availability of the stale channel estimate and the stale noise estimate from the previous subframe in one or more buffers. In some aspects, the one or more parameters satisfy the control channel BLER limit based at least in part on an SNR measurement satisfying an SNR threshold. In some aspects, a value of the SNR threshold is based at least in part on one or more of a predicted code rate for the current subframe, a channel correlation, a number of receive antennas, a bandwidth, or a residual frequency error. In some aspects, a value of the SNR threshold is stored in a table.

In some aspects, method 600 includes determining a channel estimate and a noise estimate for the current subframe, receiving a control channel transmission in a next subframe, and decoding the control channel transmission in the next subframe using the channel estimate and the noise estimate from the current subframe based at least in part on the one or more parameters satisfying the control channel BLER limit in the next subframe. In some aspects, a channel estimate and a noise estimate for the current subframe are determined in parallel with decoding the control channel transmission in the current subframe.

Although FIG. 6 shows example blocks of method 600, in some aspects, method 600 may include additional blocks, fewer blocks, different blocks, or differently arranged blocks than those depicted in FIG. 6. Additionally, or alternatively, two or more of the blocks of method 600 may be performed in parallel.

Figure 7:
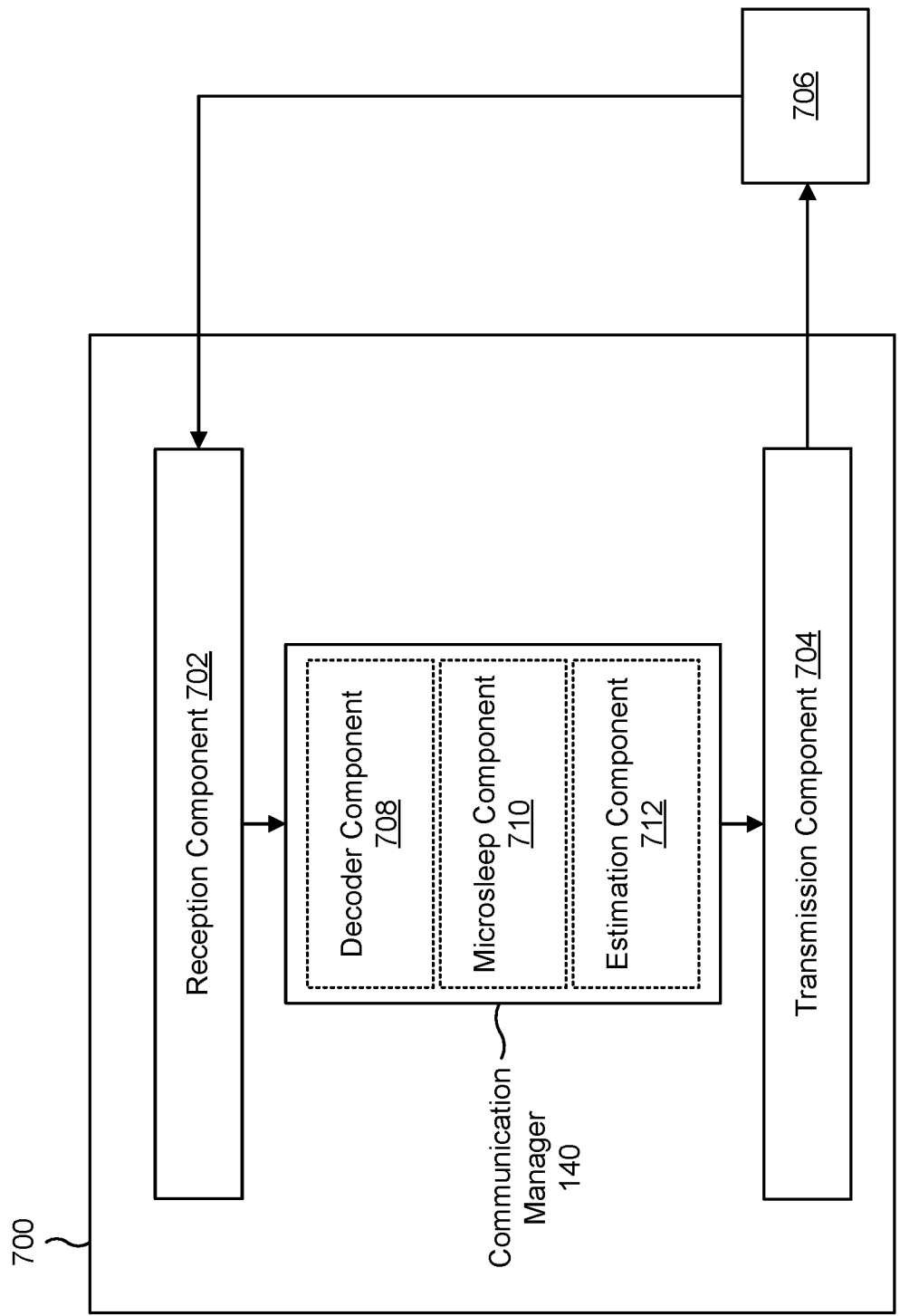
FIG. 7 is a diagram of an example apparatus for wireless communication.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a decoder component 708, a microsleep component 710, or an estimation component 712, among other examples.

In some aspects, the apparatus 700 may be configured to perform one or more operations described herein in connection with FIGS. 5A-5B. Additionally, or alternatively, the apparatus 700 may be configured to perform one or more methods described herein, such as method 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive a control channel transmission in a current subframe. The decoder component 708 may decode the control channel transmission in the current subframe using a stale channel estimate and a stale noise estimate from a previous subframe based at least in part on one or more parameters satisfying a control channel BLER limit in the current subframe. The microsleep component 710 may trigger a microsleep in the current subframe after the control channel transmission is decoded based at least in part on the decoded control channel transmission not including a downlink grant.

The estimation component 712 may determine a channel estimate and a noise estimate for the current subframe. The reception component 702 may receive a control channel transmission in a next subframe. The decoder component 708 may decode the control channel transmission in the next subframe using the channel estimate and the noise estimate from the current subframe based at least in part on the one or more parameters satisfying the control channel BLER limit in the next subframe.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
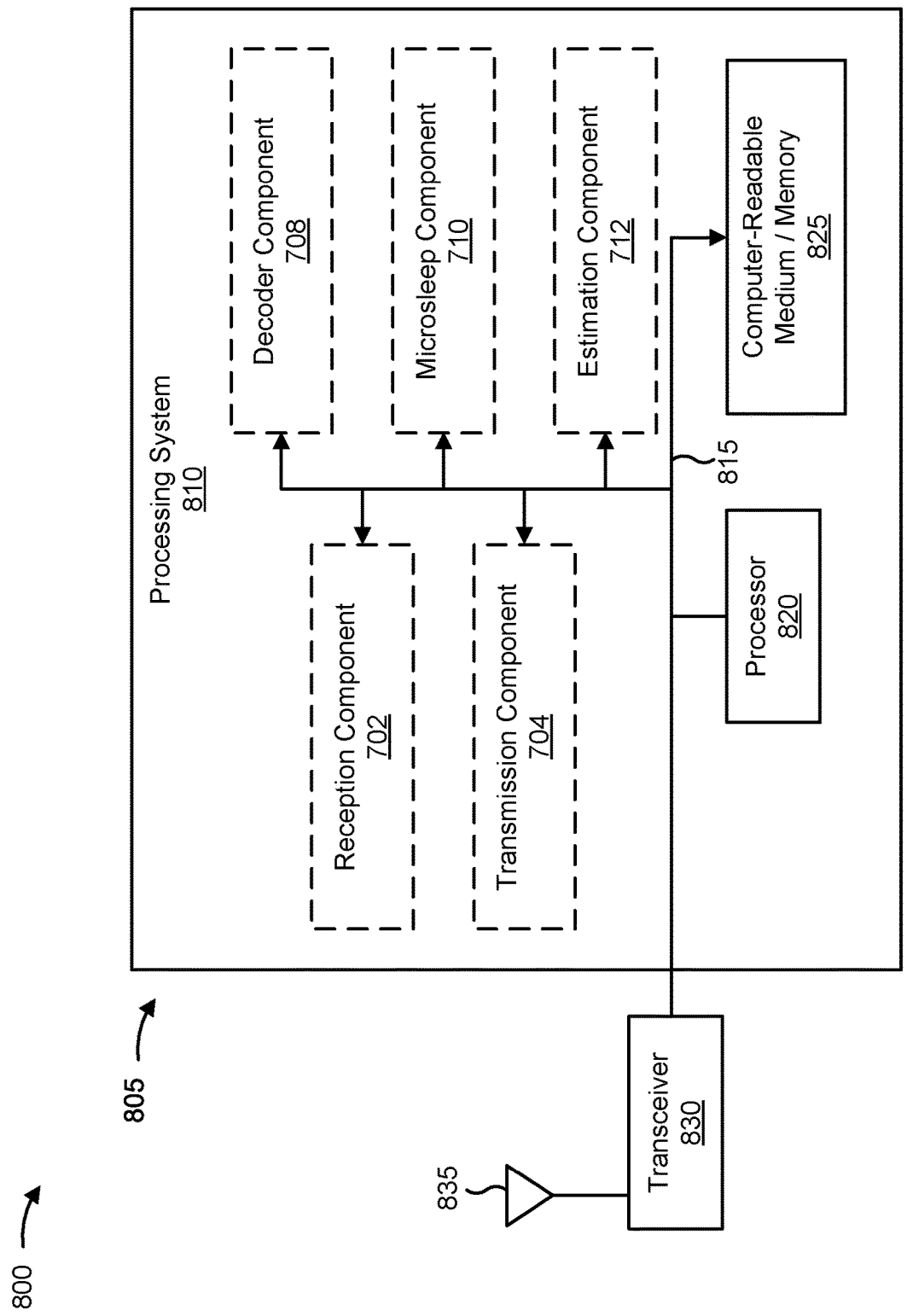
FIG. 8 is a diagram illustrating an example of a hardware implementation for an apparatus employing a processing system.

FIG. 8 is a diagram illustrating an example 800 of a hardware implementation for an apparatus 805 employing a processing system 810. The apparatus 805 may be a UE.

The processing system 810 may be implemented with a bus architecture, represented generally by the bus 815. The bus 815 may include any number of interconnecting buses and bridges depending on the specific application of the processing system 810 and the overall design constraints. The bus 815 links together various circuits including one or more processors and/or hardware components, represented by the processor 820, the illustrated components, and the computer-readable medium/memory 825. The bus 815 may also link various other circuits, such as timing sources, peripherals, voltage regulators, and/or power management circuits.

The processing system 810 may be coupled to a transceiver 830. The transceiver 830 is coupled to one or more antennas 835. The transceiver 830 provides a means for communicating with various other apparatuses over a transmission medium. The transceiver 830 receives a signal from the one or more antennas 835, extracts information from the received signal, and provides the extracted information to the processing system 810, specifically the reception component 702. In addition, the transceiver 830 receives information from the processing system 810, specifically the transmission component 704, and generates a signal to be applied to the one or more antennas 835 based at least in part on the received information.

The processing system 810 includes a processor 820 coupled to a computer-readable medium/memory 825. The processor 820 is responsible for general processing, including the execution of software stored on the computer-readable medium/memory 825. The software, when executed by the processor 820, causes the processing system 810 to perform the various functions described herein for any particular apparatus. The computer-readable medium/memory 825 may also be used for storing data that is manipulated by the processor 820 when executing software. The processing system further includes at least one of the illustrated components. The components may be software modules running in the processor 820, resident/stored in the computer-readable medium/memory 825, one or more hardware modules coupled to the processor 820, or some combination thereof.

In some aspects, the processing system 810 may be a component of the UE 120 and may include the memory 282 and/or at least one of the TX MIMO processor 266, the RX processor 258, and/or the controller/processor 280. In some aspects, the apparatus 805 for wireless communication includes means for receiving a control channel transmission in a current subframe, means for decoding the control channel transmission in the current subframe using a stale channel estimate and a stale noise estimate from a previous subframe based at least in part on one or more parameters satisfying a control channel BLER limit in the current subframe, means for triggering a microsleep in the current subframe after the control channel transmission is decoded based at least in part on the decoded control channel transmission not including a downlink grant, means for determining a channel estimate and a noise estimate for the current subframe, means for receiving a control channel transmission in a next subframe, and/or means for decoding the control channel transmission in the next subframe using the channel estimate and the noise estimate from the current subframe based at least in part on the one or more parameters satisfying the control channel BLER limit in the next subframe. The aforementioned means may be one or more of the aforementioned components of the apparatus 700 and/or the processing system 810 of the apparatus 805 configured to perform the functions recited by the aforementioned means. As described elsewhere herein, the processing system 810 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 8 is provided as an example. Other examples may differ from what is described in connection with FIG. 8.

The following provides an overview of some Aspects of the present disclosure:

Aspect 1: A method of wireless communication performed by a UE, comprising: receiving a control channel transmission in a current subframe; decoding the control channel transmission in the current subframe using a stale channel estimate and a stale noise estimate from a previous subframe based at least in part on one or more parameters satisfying a control channel BLER limit in the current subframe; and triggering a microsleep in the current subframe after the control channel transmission is decoded based at least in part on the decoded control channel transmission not including a downlink grant.

Aspect 2: The method of Aspect 1, further comprising: determining a channel estimate and a noise estimate for the current subframe; receiving a control channel transmission in a next subframe; and decoding the control channel transmission in the next subframe using the channel estimate and the noise estimate from the current subframe based at least in part on the one or more parameters satisfying the control channel BLER limit in the next subframe.

Aspect 3: The method of any of Aspects 1-2, wherein a channel estimate and a noise estimate for the current subframe are determined in parallel with decoding the control channel transmission in the current subframe.

Aspect 4: The method of any of Aspects 1-3, wherein the one or more parameters satisfy the control channel BLER limit based at least in part on a Doppler estimate satisfying a threshold.

Aspect 5: The method of any of Aspects 1-4, wherein the one or more parameters satisfy the control channel BLER limit based at least in part on a number of active component carriers satisfying a threshold.

Aspect 6: The method of any of Aspects 1-5, wherein the one or more parameters satisfy the control channel BLER limit based at least in part on a residual frequency error satisfying a threshold.

Aspect 7: The method of any of Aspects 1-6, wherein the one or more parameters satisfy the control channel BLER limit based at least in part on availability of the stale channel estimate and the stale noise estimate from the previous subframe in one or more buffers.

Aspect 8: The method of any of Aspects 1-7, wherein the one or more parameters satisfy the control channel BLER limit based at least in part on an SNR measurement satisfying an SNR threshold.

Aspect 9: The method of Aspect 8, wherein a value of the SNR threshold is based at least in part on one or more of a predicted code rate for the current subframe, a channel correlation, a number of receive antennas, a bandwidth, or a residual frequency error.

Aspect 10: The method of any of Aspects 8-9, wherein a value of the SNR threshold is stored in a table.

Aspect 11: An apparatus for wireless communication at a device, comprising a processor; memory coupled with the processor; and instructions stored in the memory and executable by the processor to cause the apparatus to perform the method of one or more of Aspects 1-10.

Aspect 12: A device for wireless communication, comprising a memory and one or more processors coupled to the memory, the one or more processors configured to perform the method of one or more of Aspects 1-10.

Aspect 13: An apparatus for wireless communication, comprising at least one means for performing the method of one or more of Aspects 1-10.

Aspect 14: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   receive a control channel transmission in a current subframe;
   decode the control channel transmission in the current subframe using a stale channel estimate and a stale noise estimate from a previous subframe based at least in part on one or more parameters satisfying a control channel block error rate (BLER) limit in the current subframe; and
   trigger a microsleep in the current subframe after the control channel transmission is decoded based at least in part on the decoded control channel transmission not including a downlink grant.

2. The UE of claim 1, wherein the one or more processors are further configured to:
   determine a channel estimate and a noise estimate for the current subframe;
   receive a control channel transmission in a next subframe; and
   decode the control channel transmission in the next subframe using the channel estimate and the noise estimate from the current subframe based at least in part on the one or more parameters satisfying the control channel BLER limit in the next subframe.

3. The UE of claim 1, wherein a channel estimate and a noise estimate for the current subframe are determined in parallel with decoding the control channel transmission in the current subframe.

4. The UE of claim 1, wherein the one or more parameters satisfy the control channel BLER limit based at least in part on a Doppler estimate satisfying a threshold.

5. The UE of claim 1, wherein the one or more parameters satisfy the control channel BLER limit based at least in part on a number of active component carriers satisfying a threshold.

6. The UE of claim 1, wherein the one or more parameters satisfy the control channel BLER limit based at least in part on a residual frequency error satisfying a threshold.

7. The UE of claim 1, wherein the one or more parameters satisfy the control channel BLER limit based at least in part on availability of the stale channel estimate and the stale noise estimate from the previous subframe in one or more buffers.

8. The UE of claim 1, wherein the one or more parameters satisfy the control channel BLER limit based at least in part on a signal-to-noise ratio (SNR) measurement satisfying an SNR threshold.

9. The UE of claim 8, wherein a value of the SNR threshold is based at least in part on one or more of a predicted code rate for the current subframe, a channel correlation, a number of receive antennas, a bandwidth, or a residual frequency error.

10. The UE of claim 8, wherein a value of the SNR threshold is stored in a table.

11. A method of wireless communication performed by a user equipment (UE), comprising:
receiving a control channel transmission in a current subframe;
decoding the control channel transmission in the current subframe using a stale channel estimate and a stale noise estimate from a previous subframe based at least in part on one or more parameters satisfying a control channel block error rate (BLER) limit in the current subframe; and
triggering a microsleep in the current subframe after the control channel transmission is decoded based at least in part on the decoded control channel transmission not including a downlink grant.

12. The method of claim 11, further comprising:
determining a channel estimate and a noise estimate for the current subframe;
receiving a control channel transmission in a next subframe; and
decoding the control channel transmission in the next subframe using the channel estimate and the noise estimate from the current subframe based at least in part on the one or more parameters satisfying the control channel BLER limit in the next subframe.

13. The method of claim 11, wherein a channel estimate and a noise estimate for the current subframe are determined in parallel with decoding the control channel transmission in the current subframe.

14. The method of claim 11, wherein the one or more parameters satisfy the control channel BLER limit based at least in part on a Doppler estimate satisfying a threshold.

15. The method of claim 11, wherein the one or more parameters satisfy the control channel BLER limit based at least in part on a number of active component carriers satisfying a threshold.

16. The method of claim 11, wherein the one or more parameters satisfy the control channel BLER limit based at least in part on a residual frequency error satisfying a threshold.

17. The method of claim 11, wherein the one or more parameters satisfy the control channel BLER limit based at least in part on availability of the stale channel estimate and the stale noise estimate from the previous subframe in one or more buffers.

18. The method of claim 11, wherein the one or more parameters satisfy the control channel BLER limit based at least in part on a signal-to-noise ratio (SNR) measurement satisfying an SNR threshold.

19. The method of claim 18, wherein a value of the SNR threshold is based at least in part on one or more of a predicted code rate for the current subframe, a channel correlation, a number of receive antennas, a bandwidth, or a residual frequency error.

20. The method of claim 18, wherein a value of the SNR threshold is stored in a table.

21. A non-transitory computer-readable medium storing a set of instructions for wireless communication, the set of instructions comprising:
one or more instructions that, when executed by one or more processors of a user equipment (UE), cause the UE to:
receive a control channel transmission in a current subframe;
decode the control channel transmission in the current subframe using a stale channel estimate and a stale noise estimate from a previous subframe based at least in part on one or more parameters satisfying a control channel block error rate (BLER) limit in the current subframe; and
trigger a microsleep in the current subframe after the control channel transmission is decoded based at least in part on the decoded control channel transmission not including a downlink grant.

22. The non-transitory computer-readable medium of claim 21, wherein the one or more instructions further cause the UE to:
determine a channel estimate and a noise estimate for the current subframe;
receive a control channel transmission in a next subframe; and
decode the control channel transmission in the next subframe using the channel estimate and the noise estimate from the current subframe based at least in part on the one or more parameters satisfying the control channel BLER limit in the next subframe.

23. The non-transitory computer-readable medium of claim 21, wherein a channel estimate and a noise estimate for the current subframe are determined in parallel with decoding the control channel transmission in the current subframe.

24. The non-transitory computer-readable medium of claim 21, wherein the one or more parameters satisfy the control channel BLER limit based at least in part on a Doppler estimate satisfying a threshold, a number of active component carriers satisfying a threshold, a residual frequency error satisfying a threshold, or availability of the stale channel estimate and the stale noise estimate from the previous subframe in one or more buffers.

25. The non-transitory computer-readable medium of claim 21, wherein the one or more parameters satisfy the control channel BLER limit based at least in part on a signal-to-noise ratio (SNR) measurement satisfying an SNR threshold.

26. An apparatus for wireless communication, comprising:
means for receiving a control channel transmission in a current subframe;
means for decoding the control channel transmission in the current subframe using a stale channel estimate and a stale noise estimate from a previous subframe based at least in part on one or more parameters satisfying a control channel block error rate (BLER) limit in the current subframe; and
means for triggering a microsleep in the current subframe after the control channel transmission is decoded based at least in part on the decoded control channel transmission not including a downlink grant.

27. The apparatus of claim 26, further comprising:
means for determining a channel estimate and a noise estimate for the current subframe;
means for receiving a control channel transmission in a next subframe; and
means for decoding the control channel transmission in the next subframe using the channel estimate and the noise estimate from the current subframe based at least in part on the one or more parameters satisfying the control channel BLER limit in the next subframe.

28. The apparatus of claim 26, wherein a channel estimate and a noise estimate for the current subframe are determined in parallel with decoding the control channel transmission in the current subframe.

29. The apparatus of claim 26, wherein the one or more parameters satisfy the control channel BLER limit based at least in part on a Doppler estimate satisfying a threshold, a number of active component carriers satisfying a threshold, a residual frequency error satisfying a threshold, or availability of the stale channel estimate and the stale noise estimate from the previous subframe in one or more buffers.

30. The apparatus of claim 26, wherein the one or more parameters satisfy the control channel BLER limit based at least in part on a signal-to-noise ratio (SNR) measurement satisfying an SNR threshold.

\* \* \* \* \*